May 13, 1941.  S. R. McKINNEY  2,241,730
COUNTER SCALE
Filed Dec. 20, 1937  4 Sheets-Sheet 1

Sidney R. McKinney

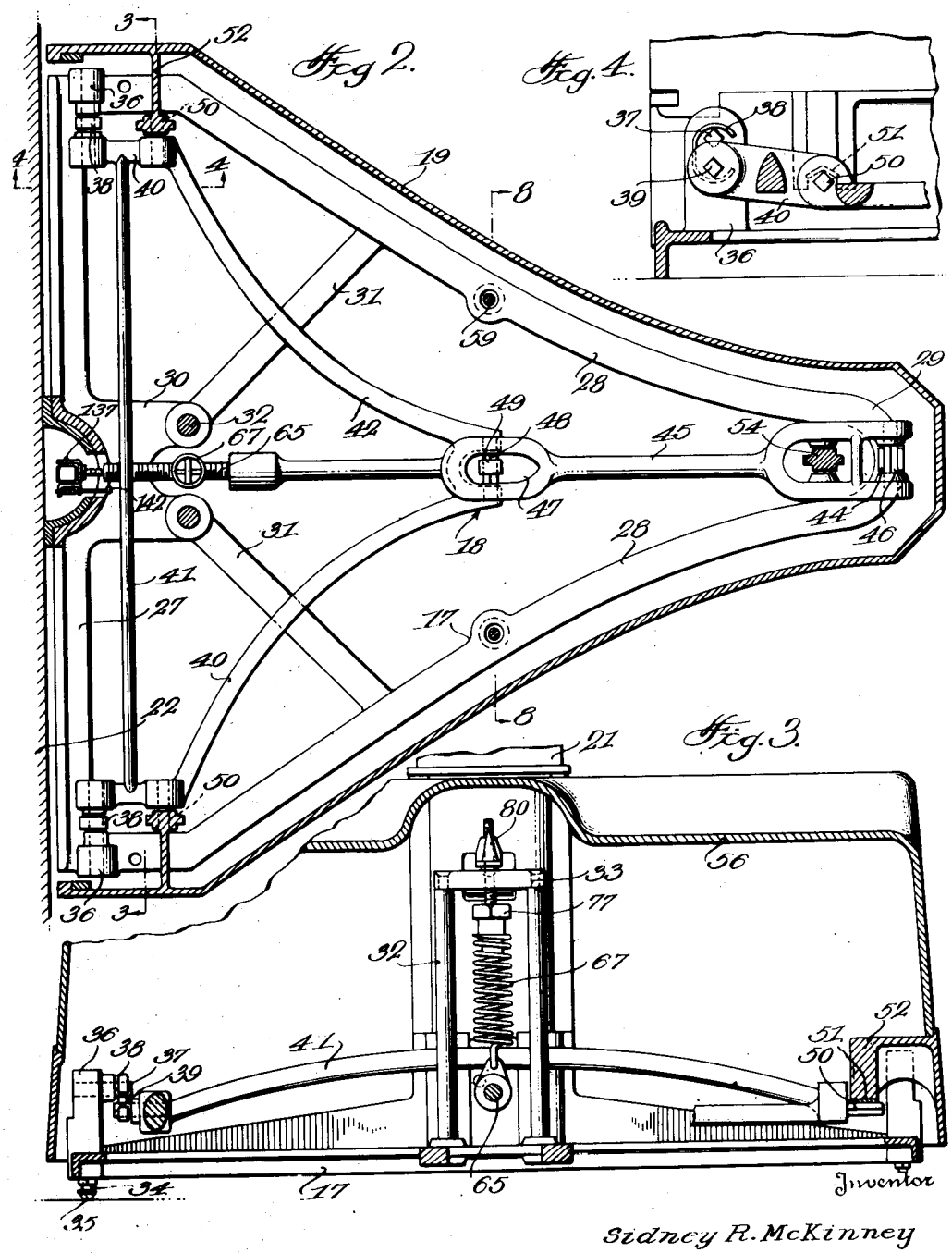

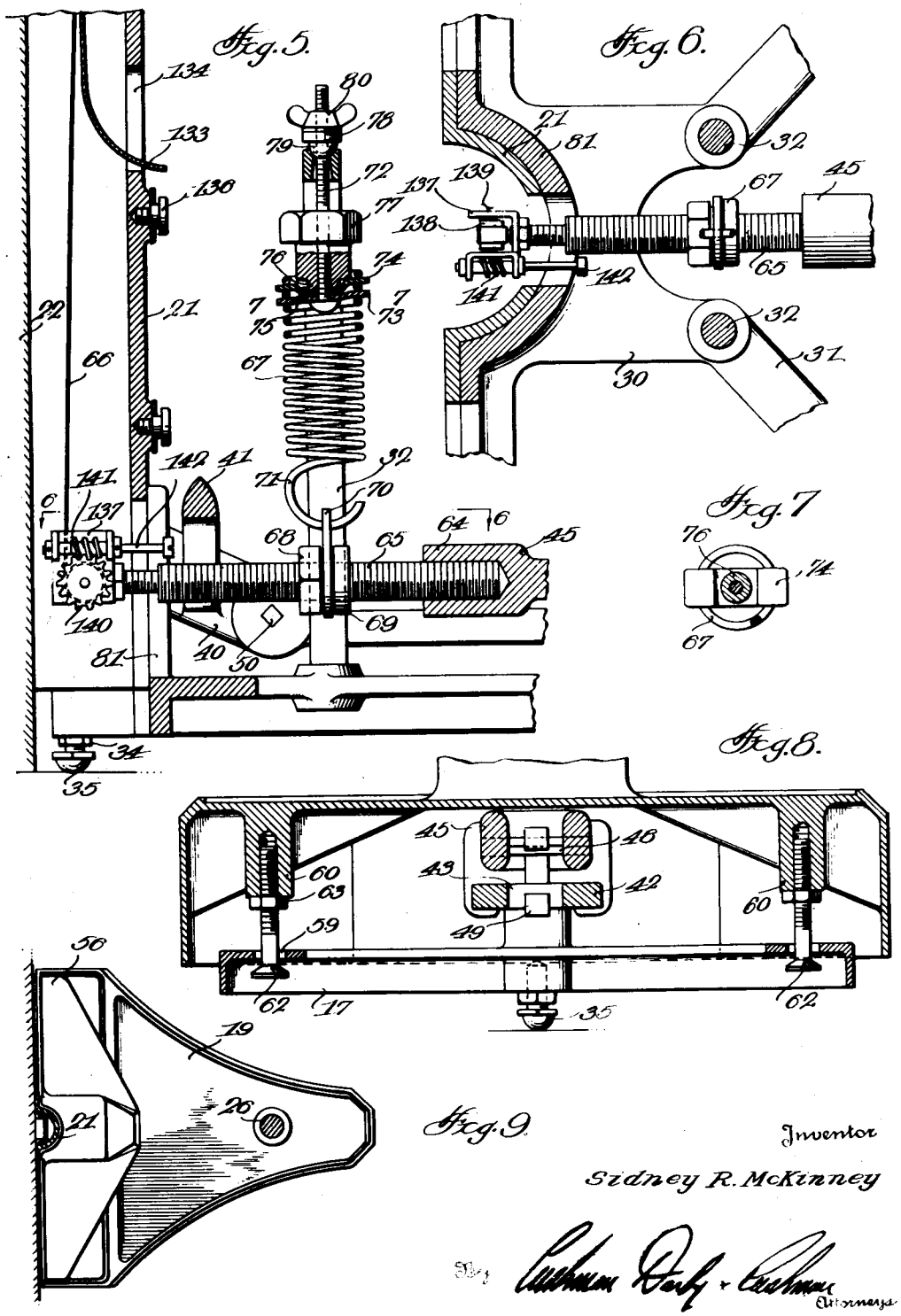

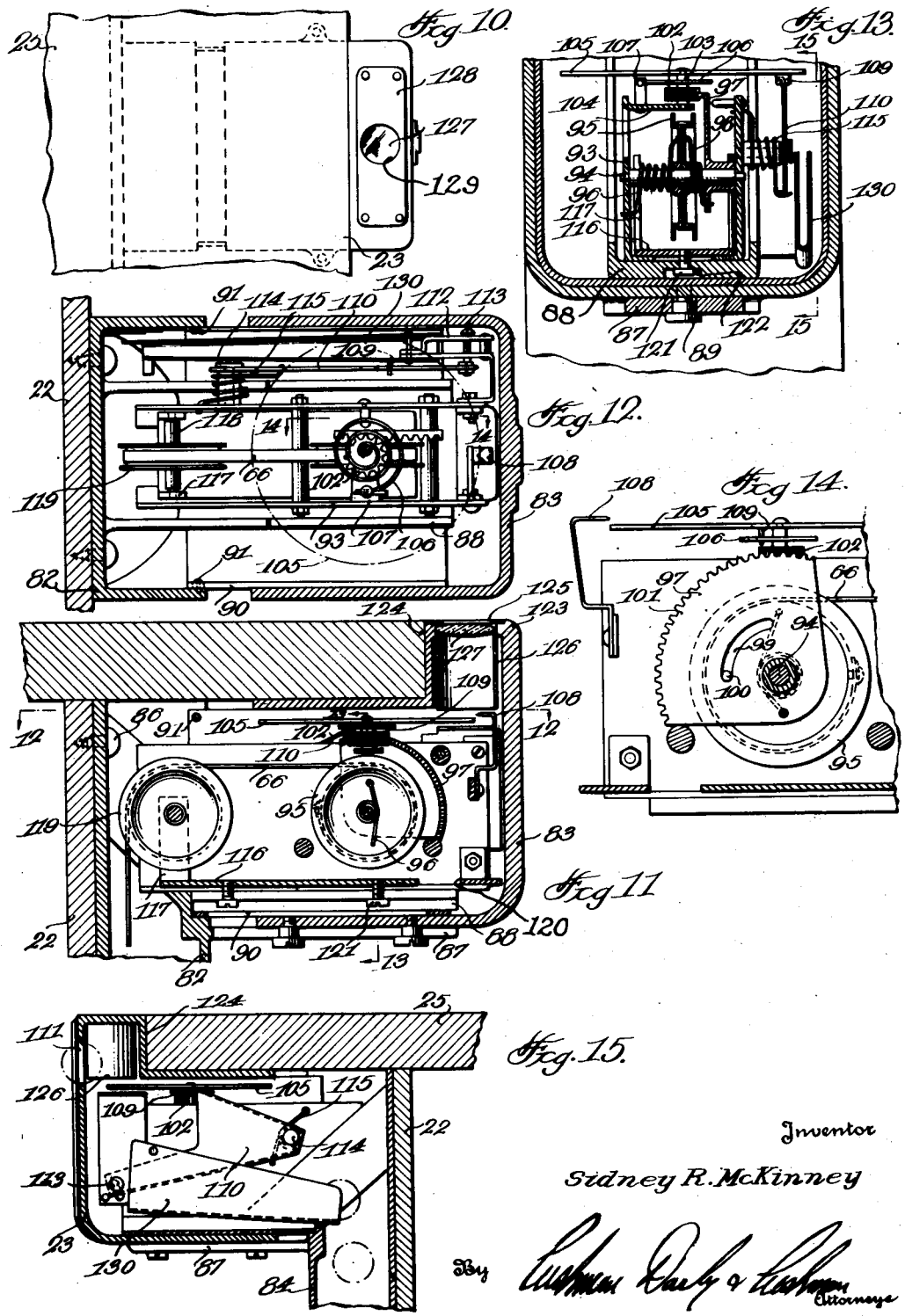

Patented May 13, 1941

2,241,730

UNITED STATES PATENT OFFICE 2,241,730

COUNTER SCALE

Sidney R. McKinney, Tulsa, Okla.

Application December 20, 1937, Serial No. 180,893

15 Claims. (Cl. 265—27)

The present invention relates to a serving counter scale of the type disclosed in my copending application, Serial No. 86,401, filed June 20, 1936, which has matured into Patent No. 2,111,671, March 22, 1938.

In both constructions, the scale includes a weighing mechanism adapted to be positioned in front of a serving counter, a platform carried by the weighing mechanism and supporting a stool or other suitable seat, and an indicating mechanism adapted to be positioned adjacent the front of the counter and connected to the weighing mechanism. The indicating mechanism is adapted to be positioned in front of and spaced from the stool sufficiently to permit a person utilizing the counter to maintain a normal and convenient posture while seated on the scale. In other words, the scale is constructed and adapted to be associated with the counter so as not to interfere in any manner with the function of the stool as a means for comfortably positioning a person at the counter.

In the present construction, the indicating mechanism of the scale includes a casing adapted to be positioned beneath the overhanging shelf of a counter, and adjacent the front end of the shelf. Both the casing and the indicating mechanism carried thereby are adapted for adjustment in a horizontal or lateral plane so as to accommodate shelves having different degrees of overhang.

A further feature includes a pedestal or standard projecting upwardly from the weighing mechanism and supporting the indicator mechanism and its casing. This pedestal is adapted to be placed against the vertical wall of the counter with the indicator casing being mounted thereon for longitudinal adjustment to accommodate counters of different heights.

Another object contemplates the use of a flexible non-stretchable cable or strap extending longitudinally of and within the pedestal and connecting the weighing and indicating mechanisms, whereby the horizontal adjustment of the indicator mechanism may be easily and quickly accomplished. The indicator casing also supports a clutch arrangement to prevent the weight of the person standing on the scale from being transmitted directly to the indicating mechanism. Incorporated with the clutch mechanism is a coin controlled releasing means which is capable of rendering the indicating means operative to designate the correct weight when a coin of the required denomination is inserted in the scale.

In the present construction, both the weighing mechanism and the platform supported thereby are so constructed that the base of the scale will not interfere with the serving facilities of the counter. In this connection, the base, the weighing mechanism and the platform are constructed in the general form of a triangle with the base of the triangle being positioned in close proximity to the wall of the counter and the apex spaced outwardly from the counter wall. The stool or seat is positioned on the platform adjacent the apex or outer end thereof. This arrangement provides adequate floor space between adjacent scales for allowing a person to conveniently ascend or leave the platform and stool.

A further object provides an efficient and compact arrangement for receiving and transporting coins from a point adjacent the indicating mechanism to a coin box positioned within the platform of the scale.

With the foregoing and other objects in view, the invention will now be more fully described, reference being had to the accompanying drawings, in which:

Figure 2 is a section taken on line 2—2 of Figure 1.

Figure 3 is a section taken on line 3—3 of Figure 2.

Figure 4 is a section taken on line 4—4 of Figure 2.

Figure 5 is an enlarged detail showing the spring for suspending the main platform lever and the means for adjusting the transmission.

Figure 6 is a section taken on line 6—6 of Figure 5.

Figure 7 is a section through the spring shown in Figure 5.

Figure 8 is a section taken on line 8—8 of Figure 2.

Figure 9 is a reduced top plan view partly in section of the scale.

Figure 10 is a view showing the indicator casing applied to the overhanging shelf of a serving counter.

Figure 11 is a vertical section through the indicating casing and mechanism.

Figure 12 is a section taken on line 12—12 of Figure 11.

Figure 13 is a section taken on line 13—13 of Figure 11.

Figure 14 is a section taken on line 14—14 of Figure 12; and

Figure 15 is a section taken on line 15—15 of Figure 13.

Figure 1:
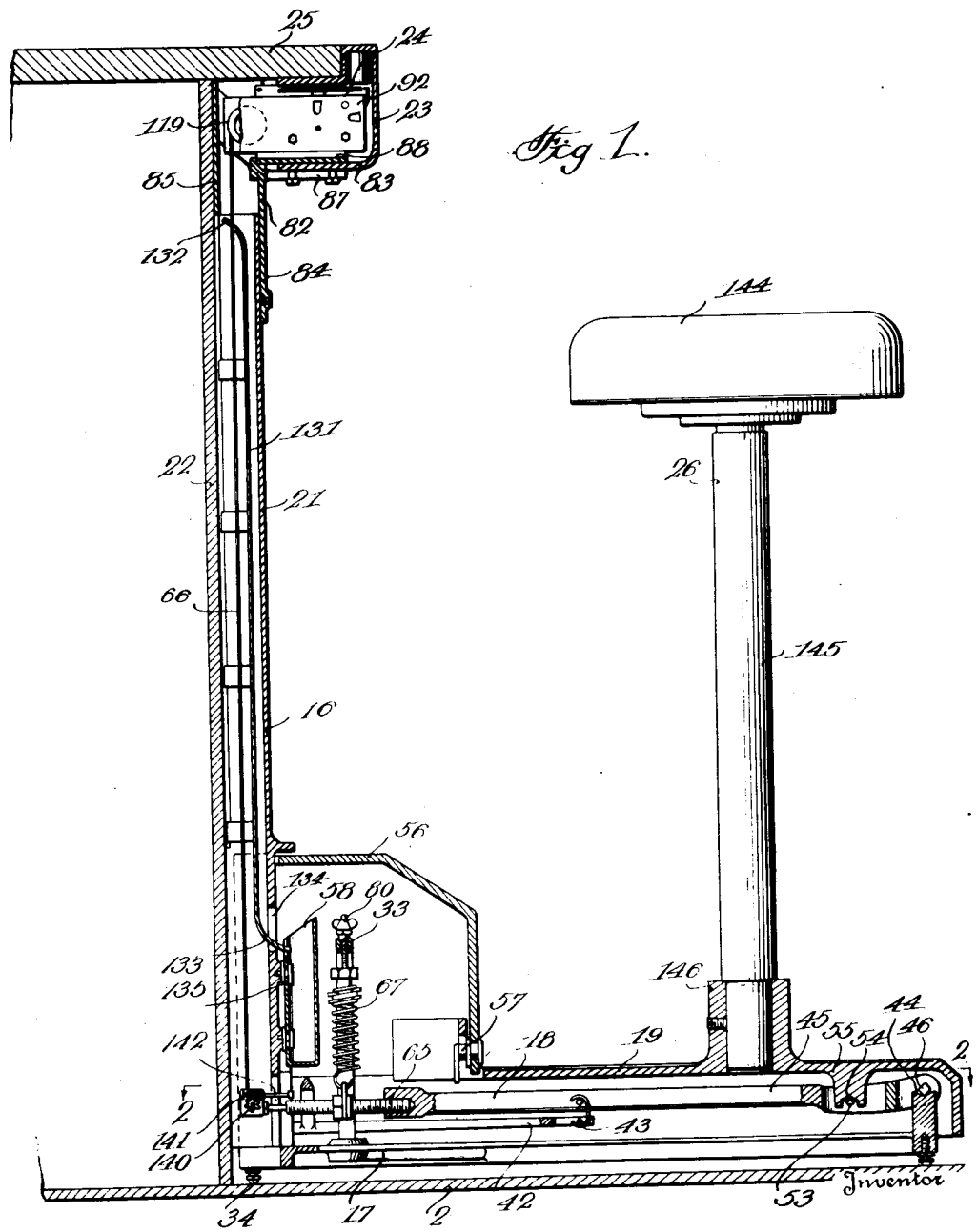
Figure 1 is a side elevation partly in section of my scale applied to the front of a serving counter.

Referring to Figure 1 of the drawings, the numeral 16 designates generally my serving counter scale comprising a base 17 supporting a weighing mechanism 18 which in turn carries a platform 19. The base is adapted to be suitably positioned upon the floor 20 and supports a standard or pedestal 21 adapted to be positioned against or in close proximity to a vertical counter wall 22. The upper end of the standard 21 carries a casing 23 which encloses and supports weight indicating mechanism 24. Both the casing and the indicating mechanism are adapted to be positioned beneath the overhanging counter shelf 25, but project outwardly therefrom sufficiently to permit the indicating mechanism to be visible to the person occupying the counter scale. A stool or other suitable seat 26 is mounted on the platform 19 adjacent the outer end thereof and is so positioned with respect to the standard and indicating mechanism as to permit a person utilizing the counter to maintain a normal and convenient posture. In fact, the entire scale is so constructed that a person not interested in weighing himself may occupy the stool and counter without any inconvenience.

In order that the scale may not occupy any unnecessary space or inconvenience a person ascending to or descending from the stool 26, I have constructed the weighing mechanism 18 and the platform 19 substantially in the form of a triangle, with the base thereof abutting the counter wall 22 and the apex positioned at the greatest distance from the counter. This arrangement is clearly shown in Figures 1, 2 and 9. The base 17 is also of substantially triangular form and includes a cross bar 27 and a pair of legs 28 which converge forwardly and connect at the front of the scale in an apex 29. The base is also provided with a plate 30 connected to the legs 28 by bars 31. All of the aforementioned elements of the base are preferably cast or formed as an integral unit. The plate 30 supports a spring suspending bracket comprising the vertical legs 32 and the cross bar 33 resting upon and connecting the top portions of the legs. For the purpose of insuring that the scale will be perfectly balanced, the base 17 is provided with a three-point support or contact with the floor 20. This comprises set screws 34 adjustably threaded in the base and provided wtih heads 35 adapted to contact with the floor. Two of the set screws 34 are positioned at opposite ends of the cross bar 27 while the third one is positioned at the apex 29 of the base.

The base also provides a three-point suspension for the weighing mechanism 18 and this comprises a pair of spaced brackets 36 carried by the cross bar 27 and positioned substantially over the rear set screws 34. Each bracket is provided with an inwardly projecting lug 37 constituting a bearing for receiving and supporting a link 38 which is of sufficient size to permit the introduction of a bearing pin 39 projecting outwardly from one side of the rear portion of an auxiliary platform lever 40. This lever is of substantially triangular formation comprising a cross bar 41 constituting a base and connecting the bearing members 39. A pair of forwardly converging arms 42 are secured to the cross bar 41 and are connected at their forward ends by a bearing element 43.

The base 17, at its apex 29, is provided with an upwardly extending post 44 constituting the third point of support for the weighing mechanism. The main platform lever 45 comprises a longitudinally extending bar projecting from front to rear of the base 17. This bar is provided with a forward bearing member 46 supported by and engaging the post 44. At an intermediate point and centrally of its ends, the main lever 45 is enlarged to form an opening 47. A bearing element 48 projects across the opening 47 and supports a link 49 which in turn engages and connects the forward end of the auxiliary lever 43 to the main lever.

With the construction as thus far described, it will be observed that the main and auxiliary platform levers 40 and 45 have a three-point mounting on the base 17, with the auxiliary lever 40 being loosely supported at its rear by the spaced links 38, while the main platform lever is supported on the post 44. In like manner, the platform 19 has a three-point mounting on the main and auxiliary levers. This platform is substantially triangular in contour conforming to the shape of the base 17. The auxiliary lever 40 at a point directly in front of each bearing 37 is provided with an outwardly projecting pin 50 constituting a bearing member for engaging a bearing element 51 carried by an inwardly depending bracket 52 positioned at the rear of and at one side of the platform 19. Each bearing element may constitute an integral part of the bracket 52, but I prefer that they be formed as separate elements capable of being replaced when worn. Furthermore, these elements are formed of steel or other hardened metal that will adequately take the wear of the platform on the levers. The third point of support of the platform 19 is on the main lever 45 directly in line with and in rear of the bearing 46. This comprises a bearing element 53 which directly contacts the steel plate 54 carried by the depending arm 55 of the platform.

The platform 19, similar to that disclosed in my copending application, is provided with an elevated portion 56 constituting a foot rest or support for the person occupying the stool 26. As distinguished from the construction disclosed in my copending application, the foot support 56 is formed as a separate detachable unit supported on the platform and secured in place by a suitable lock 57. As shown in Figure 1, the member 56 not only constitutes a foot rest, but also an enclosing casing for a coin box 58 positioned at the lower end of the standard 21. Access to the box 58 may be easily and quickly gained by unlocking and removing the foot support 56.

In order that the foot rest 56 may not be removed with the platform 19 by an unauthorized person, means are provided to lock the platform to the base, but at the same time permit relative movement between the two during the weighing operation. In this connection, the arms 28 of the base are provided with a plurality of openings 59, while the platform is formed with depending portions 60, each of which is adapted to align with one of the openings 59. Each portion 60 is drilled and threaded to receive a bolt 61, the head 62 of which projects through and is larger than its respective opening 59. A nut 63 is threaded on the bolt 61 and is engageable with the lower extremity of the portion 60 to lock the bolt against rotation. With this arrangement, the platform is capable of downward movement relative to the base 17 to take care of the usual weighing operation. However, if an attempt is made to gain access to the coin box 58 by lifting the platform and the foot rest off of the base 17, the heads 62 will contact the openings 59 and prevent disengagement of the platform from the base.

The rear end of the main lever 45 is provided with a threaded socket 64 which receives a threaded bar or bolt 65 forming a continuation of the lever. The extreme rear end of this bolt projects through the standard 21 and is adjustably connected to a flexible non-stretchable transmission tape 66 which transmits movement of the weighing mechanism to the indicating mechanism 24.

The bolt 65 also passes between the legs 32 and at this point is supported in operative position by a coil spring 67 which is suspended from the cross bar 33. A nut or sleeve 68 is threaded on the bolt 65 and is provided with an annular groove 69 which loosely receives and anchors an apertured ring 70 on the collar 68. The lower end 71 of the spring passes through the aperture in the ring 70, while the upper portion of the spring is connected to the cross bar 33 by means of a bolt 72. This bolt is adjustably connected to the spring 67 by a pair of plates 73 and 74 which are inserted between adjacent convolutions of the spring and are provided with aligned apertures for receiving the bolt 72. The lower plate 73 contacts with the head of the bolt 72, while the upper plate 74 is provided with a depressed portion 75 which receives the reduced portion 76 of a nut 77 threaded on the bolt 72.

Referring particularly to Figure 5, it will be observed that by screwing up on the nut 77, the plates 73 and 74 will be clamped to each other and to the convolution of the coil which they embrace, thereby preventing any movement of the plates with respect to the coil spring during operation of the scale. The upper end of the bolt 72 passes through an opening in the cross bar 33 and is suspended from the bar by a nut 78. The lower end of this nut is provided with a substantially semi-spherical portion 79 sitting in a corresponding recess in the cross bar 33. This construction forms a universal mounting for the nut and spring in the cross bar 33 and permits the rear end of the main lever to be positioned correctly with respect to the rest of the weighing mechanism. A wing nut 80 cooperates with the nut 78 to lock the bolt 72 in adjusted position. With this construction, it will be apparent that at least three points of adjustment are provided in setting up the scale to register the correct weight, that is, the collar 68 may be adjusted on the rod 65 and the spring may be raised or lowered by adjusting the nuts 78 and 80. Furthermore, the plates 73 and 74 may be adjusted to different positions on the spring and retained in such adjusted position.

If desired, the standard 21 may be formed as an integral part of the base 17, but as shown in Figures 1, 5 and 6, I prefer to form it as a separate element having its lower end clamped to an upstanding plate 81 of the base 17. Since the standard is adapted to be positioned in contact with or at least in close proximity to the vertical wall 22 of the serving counter, I preferably form the standard of substantially semi-circular contour in cross section, with its rear portion open to the counter wall.

The indicator casing 23 consists of two main sections 82 and 83, with the section 82 having a depending portion 84 telescopically embracing the upper part of the standard 21 and adjustably supported thereon. As distinguished from the standard, the casing section 82 has a back plate 85 adapted to contact the upper end of the counter wall 22 beneath the overhanging shelf 25. The section 82 is provided with a pair of screw openings to permit screws 86 to be used for attaching the casing to the counter wall 22. The upper portion of this section is open to permit the casing to be secured to the counter and also to allow adjustment of the indicator mechanism in the casing.

Referring particularly to Figures 1 and 10 to 15, it will be observed that the casing section 82 is provided with a pair of laterally or horizontally extending spaced superposed arms 87 and 88. The lower arm 87 is longitudinally slotted to receive the screws 89 threadedly carried by the outer section 83 and this section slides on the arm 87 to different positions of adjustment. The outer section 83, in its innermost position, cooperates with the inner section 82 to form a closed casing. However, when the section 83 is adjusted outwardly a sufficient distance to accommodate a shelf having a substantial degree of overhang, the walls of the two sections will be separated a substantial distance. In order to take care of this expediency, the inner casing is provided with a detachable trough-like casing element 90, which forms an extension of the inner casing walls and completely surrounds the base and the sides of the indicating mechanism.

The element 90 is sufficiently resilient to permit flexing of its side walls and each of these is provided with aligned apertures which engage pins 91 carried by the spaced walls of the inner section 82. In operative position, the section 90 contacts with the under surface of the top arm 88, and is completely surrounded and received by the outer casing 83 when the latter is slipped inwardly on the arm 87.

The upper arm 88 adjustably supports a frame 92 which in turn supports the indicating mechanism. The frame is of substantially channel-shaped formation having spaced side walls 93 between which a shaft 94 is journalled. This shaft is adapted to form a part of a clutch mechanism which is associated with and may broadly be considered as constituting a part of the indicating mechanism of the scale. The purpose of the clutch is to prevent the weight of the person standing on the scale from being transmitted directly to the indicator.

A pulley 95 is fixedly mounted on the shaft 94 to rotate therewith, and a coil spring 96 is wound on the shaft and has one end secured to the casing 92 and the other end to the pulley 95, whereby rotation of the pulley and shaft in one direction will place a tension on the spring. The pulley 95 is designed to receive the upper end of the transmitting tape 66 and to receive and transmit the pull of the weighing mechanism to the indicator. Mounted coaxially with the pulley is a gear segment 97. This segment is journalled on the shaft 94 and is capable of being rotated relative to the pulley. A second coil spring 98 is wrapped about the shaft 94 between the pulley and segment and has opposite ends secured to each of these elements. The segment is also provided with an arcuate slot 99, while the pulley 95 has a laterally extending stop pin 100 projecting into the slot 99 and adapted to limit relative movement between the pulley and segment.

The outer extremity of the segment is provided with teeth 101 which mesh with a pinion 102, journalled on a stub shaft 103 supported upon a struck-up portion 104 of one of the side walls 93 of the frame 92. The pinion is rigidly secured to an indicating disc 105 having suitable indicia to designate the weight of the person being weighed. Both the disc 105 and the pinion are detachably supported on the shaft 103 and in order to prevent lashing of the indicator disc and to take up any lost motion between the gear segment and the pinion, a hair spring 106 is provided. One end of this spring is connected to a post 107 carried by the struck-up portion 104, while the other end of the spring is secured to the stub joining the pinion and disc. A stationary pointer 108 is carried at the front of the frame and overlies the indicator disc 105 adjacent its periphery. The disc is provided with a depending stop 109 which cooperates with a releasable trip member 110 for normally holding the disc against rotary movement.

With the construction as above described and assuming that the indicator disc has been set so that the zero markings will register with the pointer 108, the weight of the person sitting on the stool 26 will be transmitted from the platform 19 to the main and auxiliary levers 40 and 45. This will have the effect of moving the rear end of the main lever 45 downwardly against the tension of the spring 67. This movement will be transmitted through the flexible tape 66 to the pulley 95 secured to the upper end of the tape. The pulley will be rotated against the tension of the spring 96, but the gear segment 97 will be held against rotation by the trip member 110. This action will have the effect of moving the pulley 95 relative to the gear segment and also against the tension of the spring 98. At the same time, the stop pin 100 will move forwardly in the slot 99. No action will be imparted to the indicator disc until a coin has been inserted in the coin slot 111 located in the front wall of the outer casing section 83. When a coin is inserted in the slot, it will drop downwardly between the plates 112 until it engages the cross bolt or screw 113. This bolt is carried by the trip member 110 which is pivoted on the stop shaft 114 and normally urged in an upward direction by the coil spring 115. The weight of the coin will depress the bolt 113, moving the trip member 110 about its pivot sufficiently to carry it below the stop 109 on the indicator disc. The disc will then be free to rotate to the position to indicate the weight of the person seated on the stool.

As has already been stated, the frame 92 is supported on the upper laterally extending arm 88. Within the frame 92 is an auxiliary frame or plate 116. This plate carries at its rear end a pair of spaced arms 117 between which is journalled a shaft 118. A second pulley or roller 119 is mounted on this shaft for the purpose of receiving and guiding the flexible tape 66 in its movement from a vertical to a horizontal position. In the innermost position of adjustment of the frame 92 and the auxiliary frame or plate 116, the front of the plate will abut against a stop element 120 located at the front of the frame 92. The plate 116 is capable of adjustment relative to the frame to take care of different degrees of overhang of counter shelves. It will be observed that the same means that adjustably secures the frame 92 to the arm 88 is utilized to clamp the plate 116 to the frame. This comprises the screws 121 which operate in the longitudinal slot 122 of the arm 88. By loosening the screws 121, the frame may be adjusted outwardly in a substantially horizontal direction on the arm 88 to the desired position where the disc will be visible at the edge of the counter. The plate 116 is designed to remain at the rear of the casing so as to be in the correct position to guide the tape 66 in both its horizontal and vertical positions in the standard and casing. When the frame has been horizontally adjusted as desired, then it may be clamped to the plate 116 and the arm 88 by tightening the screws 121. Referring to Figures 1, 11 and 12, it will be observed that in adjusting the frame 92, the peripheral portion of the indicator disc 105 and the stationary pointer 108 should extend beyond the end of the shelf.

In adjusting the frame 92, it is to be assumed that the casing section 83 has been removed. However, after this adjustment, the section 83 may then be slipped over the frame 92 until the inner wall of the step or elevated portion 123 abuts the edge 124 of the shelf. The elevated step 123 may, of course, be eliminated if desired, and a sight opening formed in the top wall of the section 83 directly over the pointer and indicator disc. However, in the preferred form of the invention, the step is provided and has a centrally disposed opening 125. A tube 126 is suitably mounted in the casing section in alignment with the opening 125 and a magnifying glass 127 is inserted in the opening to rest upon the top of the tube. A metal plate 128 is secured to the top of the step and is provided with a central opening 129 aligned with the magnifying glass and tube whereby the pointer 108 and the peripheral portions of the indicator disc 105 will be visible to a person occupying the stool and counter.

Referring to Figures 12 and 15, it will be observed that the plates 112 are positioned below the slot 111 and are located in front of and overlap a rearwardly inclined coin guide 130. Thus, after the coin has depressed the bolt 113 and released the trip member 110, it will be guided rearwardly by the member 130 and will drop into the vertical portion 85 of the casing section 82. The standard 21 is provided with a longitudinally extending plate 131 (Figures 1 and 5) which is spaced from the front thereof and forms with the same a longitudinally extending coin passage. The rear end of the coin guide 130 terminates adjacent the front wall and to one side of the vertical portion 85, and the upper end of the plate 131 is provided with a rearwardly curved portion 132 adapted to receive and guide the coins into the longitudinally extending passage in the standard. The lower end of the plate 131 is formed with a forwardly curved portion 133 which projects through an opening 134 in the lower portion of the standard and terminates at a point just in advance of the rear wall of the coin box 58. With this arrangement, the coin after passing through the guide 130 will drop down upon the curved portion 132 of the plate and fall through the longitudinal passage, striking the forwardly curved portion 133 and finally dropping into the coin box 58.

As will be observed, the coin box is detachably mounted on the lower end of the standard. In this connection, the rear wall of the box is provided with a pair of aligned key-hole slots 135 which engage and are supported upon headed elements 136 carried by the standard. Thus, when the box is filled, it may be easily removed and emptied after the elevated foot rest 58 has been moved from the platform 19.

The flexible transmission tape 66 is formed of a non-stretchable material, and is adjustably connected to the extreme rear end of the main lever 45. This of course comprises the end of the rod or bolt 65. Referring to Figures 1, 5 and 6, both the plate 81 and the lower end of the standard 21 are provided with aligned slots through which the extreme end of the rod 65 projects into the standard. In setting up the scale for use at a serving counter, it will be necessary not only to make adjustments to the collar 68 and the nuts 77 and 78, but also to the transmission tape 66 in order that the zero markings on the indicator disc 105 will align with the stationary pointer 108. This adjustment is accomplished by mounting a bracket 137 on the end of the rod 65. In this bracket is journalled a pulley or roller 138 upon which the lower end of the tape is wound and secured. To the pulley shaft 139 is fixedly mounted a worm gear 140 and this meshes with a worm 141 also mounted in the bracket. The worm shaft 142 extends forwardly through the openings in the standard and plate 81 and terminates in a screw head 143. Thus, by removing the foot rest 56, the tape adjusting mechanism is accessible and may be actuated by a screw driver or other suitable tool.

The stool 20 may be of any desired type. As shown in Figure 1, it comprises a seat 144 detachably and rotatably supported on a pedestal 145. The lower end of this pedestal is received in and detachably supported by a collar 146 formed as a part of the platform 19.

It is to be understood that while the indicating mechanism of the scale is constructed primarily for use with serving counters having overhanging shelves, it may nevertheless be used with other types of counters. Furthermore, while the stool 20 is the desired type of seat, any other support may be mounted on the platform 19.

It is also to be understood that such variations from the construction herein shown and described as are within the skill of a mechanic may, of course, be made without departing from the range of my invention.

I claim:

1. A weighing scale for use with a serving counter having an overhanging shelf, said scale including weighing mechanism adapted to be positioned in front of the counter, a platform associated with the weighing mechanism, a stool mounted on the platform and adapted to be spaced from the counter sufficiently to permit a person occupying the stool to utilize the counter, a standard extending upwardly from the weighing mechanism and adapted to be positioned beneath the shelf, weight indicating mechanism supported at the upper end of the standard and adapted to be associated with the shelf, said indicating mechanism being mounted for horizontal adjustment on the standard to accommodate different size shelves and located in front of but spaced from the stool sufficiently to permit a person utilizing the counter to maintain a normal and convenient posture even in the most extreme position of adjustment of the indicating mechanism, a transmission tape carried by and extending longitudinally of the standard, said tape having its upper end connected to said horizontally adjustable indicating mechanism, and means carried by the weighing mechanism for adjustably connecting the lower end of the tape thereto to permit adjustment of the indicating mechanism to zero position.

2. In a weighing scale, a frame, main and auxiliary platform levers carried by said frame, said main lever comprising a bar extending longitudinally of the frame and pivotally supported thereon at one end, the other end of said bar being adapted to be connected to the indicating mechanism of the scale, said auxiliary lever having a double point of pivotal support on said frame and connected to the main lever intermediate the ends of said main lever, a platform having a double point of support on said auxiliary lever and single point of support on said main lever, the sides of said platform converging toward the single point of support on the main lever, and a stool carried by said platform adjacent its narrow end and positioned substantially in line with the main lever.

3. Weight indicating mechanism adapted to be associated with the weighing mechanism of a scale and adapted for use with a counter, said mechanism including a frame adapted to be positioned adjacent the counter and having a pair of spaced supporting arms, an indicator element adjustably carried by one of said arms for movement in a substantially horizontal plane to accommodate different size counters, and an indicator enclosing casing adjustably carried by the other arm and provided with a window for said indicator element.

4. Weight indicating mechanism adapted to be associated with the weighing mechanism of a scale and adapted for use with a counter having an overhanging shelf, said mechanism including a casing adapted to be positioned beneath the shelf, an indicator supporting frame adjustably mounted in said casing for movement in a substantially horizontal plane to accommodate different size shelves, and an indicator disc operatively supported by and above the frame and adapted to be adjusted with the frame to a position where at least a portion of the disc will be visible in front of the counter shelf.

5. Weight indicating mechanism adapted to be associated with the weighing mechanism of a scale and adapted for use with a counter having an overhanging shelf, said mechanism including a support adapted to be positioned beneath the shelf, a tape receiving and positioning member carried by and normally positioned at the rear of the support, an indicator element carried by said support in front of said member, said member and indicator element being adjustable relative to each other in a substantially horizontal plane to accommodate different size shelves, and a flexible transmission tape associated with said indicator element and said member and adapted to connect with the weighing mechanism of the scale.

6. Weight indicating mechanism adapted to be associated with the weighing mechanism of a scale and adapted for use with a counter having an overhanging shelf, said mechanism including a casing adapted to be positioned beneath the shelf, an indicator element adjustably mounted in said casing for movement in a substantially horizontal plane to accommodate different size shelves, said casing having a head adjustably mounted thereon and cooperating therewith to enclose the indicator element, said head having an opening associated with and rendering the indicator element visible.

7. Weight indicating mechanism adapted to be associated with the weighing mechanism of a scale and adapted for use with a counter having an overhanging shelf, said mechanism including a casing adapted to be positioned beneath the shelf, an indicator element adjustably mounted in said casing for movement in a substantially horizontal plane to accommodate different size shelves, said casing having a head adjustably mounted thereon and cooperating therewith to enclose the indicator element, said head having an opening at its extreme front associated with the indicator element and adapted to be positioned in front of the shelf to render the indicator element visible.

8. Weight indicating mechanism adapted to be associated with the weighing mechanism of a scale and adapted for use with a counter having an overhanging shelf, said mechanism including a casing adapted to be positioned beneath the shelf, an indicator element adjustably mounted in said casing for movement in a substantially horizontal plane to accommodate different size shelves, said casing having a head adjustably mounted thereon and cooperating therewith to enclose the indicator element, said head having a raised portion adapted to engage the edge of the shelf and provided with an opening associated with and rendering the indicator element visible.

9. Weight indicating mechanism adapted to be associated with the weighing mechanism of a scale and adapted for use with a counter having an overhanging shelf, said mechanism including a frame adapted to be positioned beneath the shelf, a pulley journalled in the frame and adapted to be connected to the weighing mechanism of the scale and rotated under tension during the weighing operation, a gear segment journalled in the frame concentrically to said pulley and rotatable relative thereto under spring tension, means carried by said pulley for limiting relative movement between the pulley and segment, an indicator element operatively connected to the gear segment, and releasable means for holding the indicator element in zero position while permitting movement of the pulley.

10. Weight indicating mechanism adapted to be associated with the weighing mechanism of a scale and adapted for use with a counter having an overhanging shelf, said mechanism including a frame adapted to be positioned beneath the shelf, a shaft journalled in the frame, a pulley fixed to said shaft and adapted to be connected to the weighing mechanism of the scale, a spring associated with said pulley and frame and placing the pulley under increasing tension when rotated in the frame, a gear segment journalled on said shaft in close proximity to the pulley, a spring connecting the pulley and segment and adapted to place the segment under tension upon rotation of the pulley, a stop carried by the pulley for limiting relative movement between the pulley and segment, an indicator element positioned above said pulley and segment and operatively connected to the latter, and releasable means for holding the indicator element in zero position while permitting movement of said pulley against the tension of both springs.

11. In a weighing scale for use with a serving counter, weighing mechanism adapted to be positioned in front of the counter and including a platform having a base adapted to be positioned adjacent the counter, said platform having sides which converge forwardly from the base, and a stool carried by the platform adjacent its narrow forward end.

12. Weight indicating mechanism adapted to be associated with the weighing mechanism of a scale and adapted for use with a counter having an overhanging shelf, said mechanism including a sectional casing adapted to be positioned beneath the shelf, an indicator element carried by said casing, said casing having a section adjustably mounted thereon and cooperating therewith to enclose the indicator element, said section having a raised portion adapted to engage the edge of the shelf and provided with an opening through which the indicator element is adapted to be viewed.

13. Weight indicating mechanism adapted to be associated with the weighing mechanism of a scale and adapted for use with a counter having an overhanging shelf, said mechanism including a sectional casing adapted to be positioned beneath the shelf, an indicator element carried by said casing, said casing having a section adjustably mounted thereon and cooperating therewith to enclose the indicator element, said section having a narrow raised portion at its extreme front, adapted to engage the front edge of the shelf, the top wall of said raised portion having an opening through which the indicator element is adapted to be viewed.

14. Weight indicating mechanism adapted to be associated with the weighing mechanism of a scale and adapted for use with a counter having an overhanging shelf, said mechanism including a sectional casing adapted to be positioned beneath the shelf, and including front and rear sections, weight indicating mechanism carried by the rear section, one section being adjustable relative to the other section to accommodate shelves of different sizes and said sections cooperating to enclose the indicating mechanism, said front section being provided with a sight opening adjacent its front end adapted to be positioned in front of the shelf and through which the indicator mechanism may be viewed.

15. Weight indicating mechanism adapted to be associated with the weighing mechanism of a scale and adapted for use with a counter having an overhanging shelf, said mechanism including a sectional casing adapted to be positioned beneath the shelf, and including front and rear sections, weight indicating mechanism carried by the rear section, the front section being telescopically and adjustably mounted on the rear section to accommodate shelves of different sizes and said sections cooperating to enclose the indicating mechanism, said front section having a restricted sight opening adjacent its front end adapted to be positioned in front of the shelf and through which the indicating mechanism may be viewed.

SIDNEY R. McKINNEY.